Aug. 27, 1957
G. RASHID
2,804,160
AUTOMATIC VEHICLE CONTROL SYSTEM
Filed Jan. 27, 1954
2 Sheets-Sheet 1
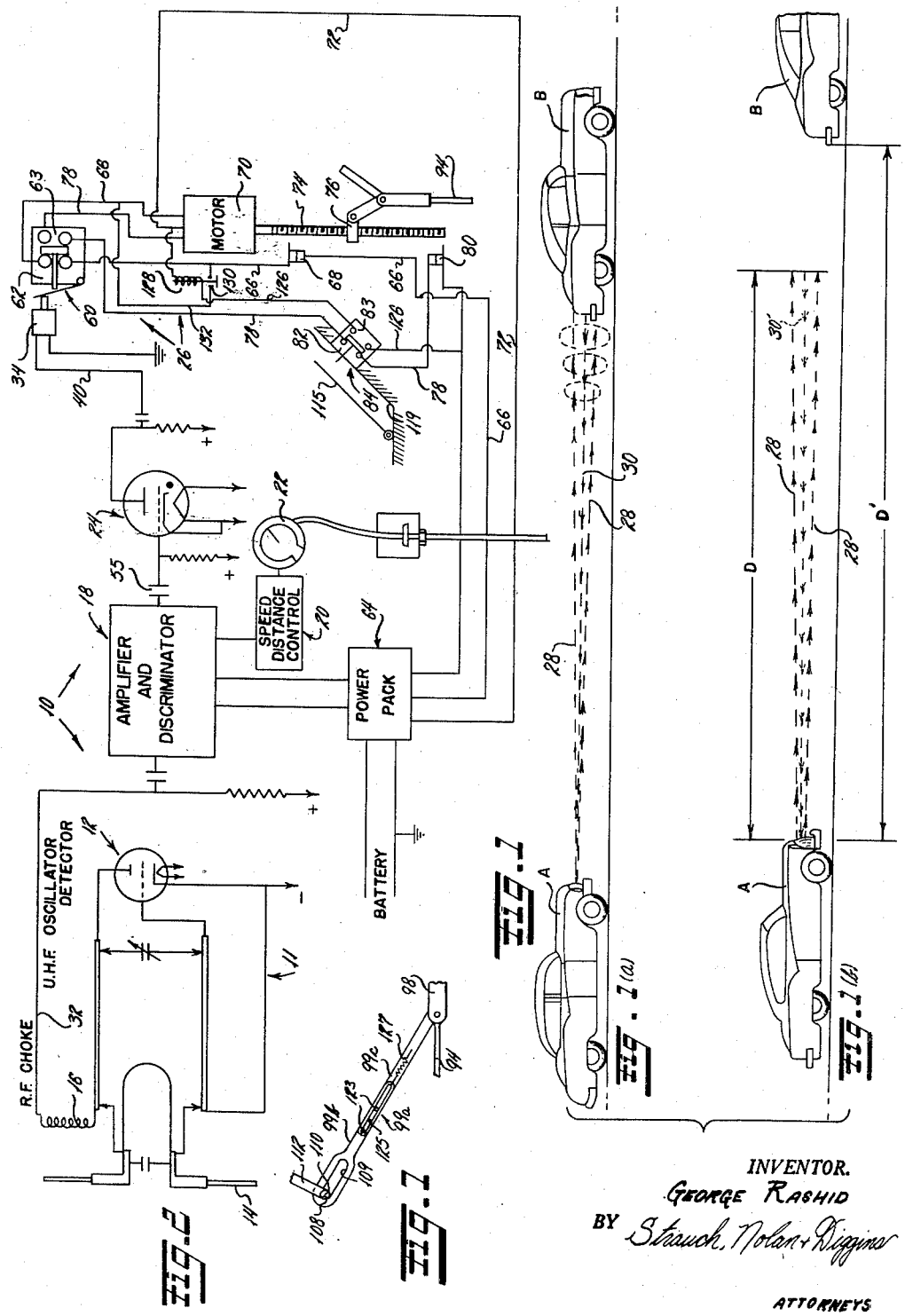
INVENTOR.
GEORGE RASHID
BY Strauch, Nolan + Diggins
ATTORNEYS Aug. 27, 1957
G. RASHID
2,804,160
AUTOMATIC VEHICLE CONTROL SYSTEM
Filed Jan. 27, 1954
2 Sheets-Sheet 2
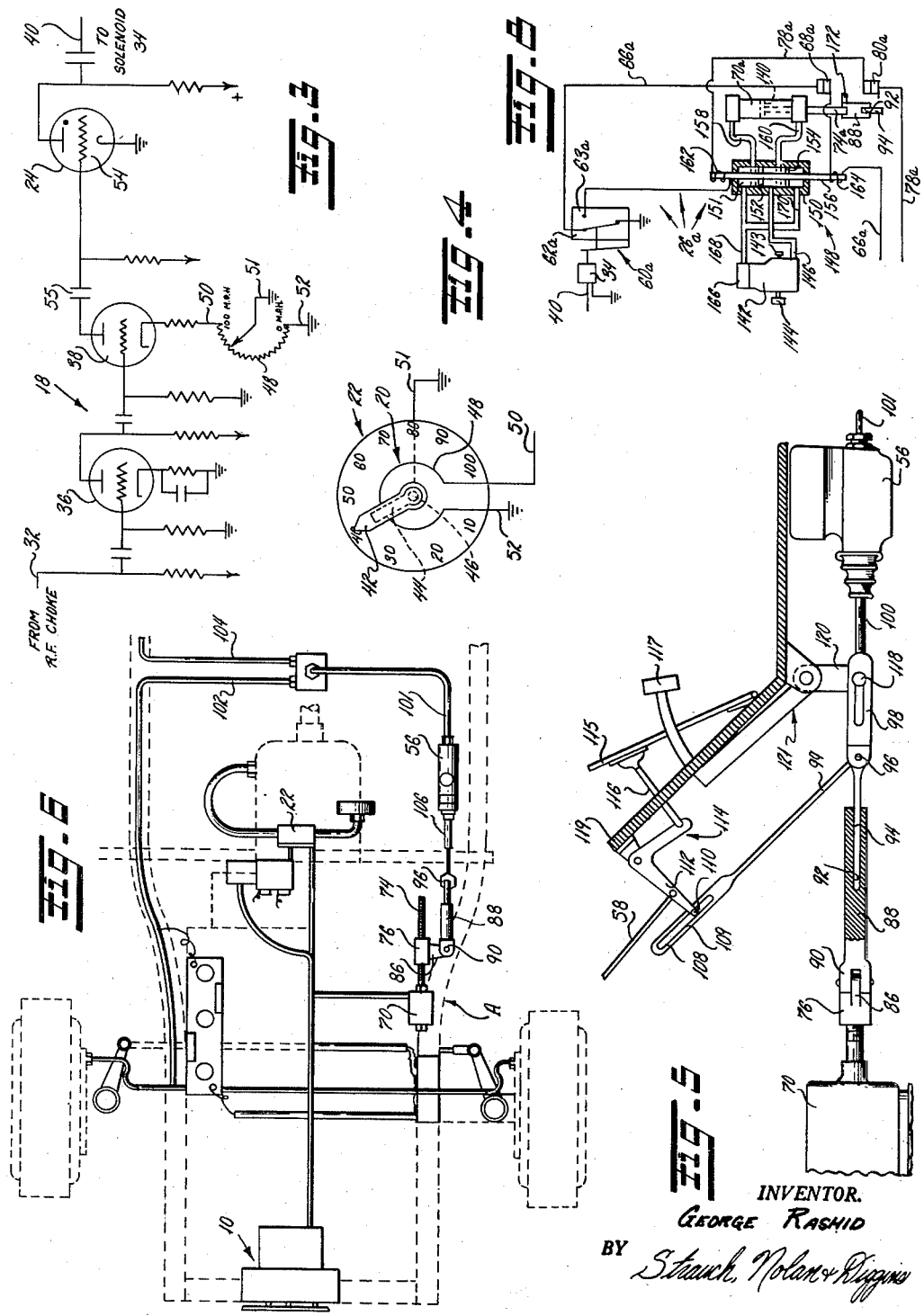
INVENTOR.
GEORGE RASHID
BY Strauch, Nolan & Riggins
ATTORNEYS United States Patent Office 2,804,160
Patented Aug. 27, 1957

2,804,160

AUTOMATIC VEHICLE CONTROL SYSTEM

George Rashid, Detroit, Mich.

Application January 27, 1954, Serial No. 406,520

19 Claims. (Cl. 180—82.1)

The present invention relates to an automatic control means for self-propelled dirigible vehicles such as automobiles, trains, aircraft, ships and the like. More particularly, it relates to a control system for such vehicles which causes the vehicle to be automatically stopped and/or slowed in speed under dangerous conditions independently of and without waiting for the necessary mental and physical reactions of the vehicle operator.

The present application is a continuation-in-part of my copending application Serial No. 289,406 filed May 22, 1952, and now abandoned, for an "Automatic Vehicle Control System."

For clarity and to avoid undue repetition, the discussion and description herein will be largely based on an illustrative application of the automatic vehicle control device of the present invention to automobiles, trucks, buses and other highway vehicles, in view of the present acuteness of the automotive and highway problems which can be eliminated and minimized by utilization of the present invention. However, various discussions and descriptions herein of the present invention in connection with the automobile are also applicable to other forms of vehicles such as trains, aircraft (especially when taxiing), ships and the like, particularly to trains.

Control of a vehicle, such as an automobile, on the highways depends on a number of variable factors including absolute speed of the vehicle with relationship to the earth; rate of closure between the vehicle and an obstacle before it, e. g. another vehicle; minimum required safe stopping distance at any given speed after the vehicle's brakes (or like controls) are applied, due to such factors as inertia, tire skid, etc. These variables are inherent in the operation of such vehicles due to basic physical laws.

A further and even more important variable from a practical point of view is the vehicle operator's reaction time. The operator's control of vehicles of this kind, e. g., automobiles, depends on certain mental and physical reactions to stimuli during operation of the vehicle which the operator has learned to evaluate as a result of experience and react accordingly in the light thereof to control the vehicle. Each operator's mental and physical reactions and hence his speed and dexterity in controlling the vehicle in emergency circumstances varies considerably due to such factors as the operator's age, health, general physiological and psychological make-up, his state of mind etc. For example, it is commonly recognized that young people react more quickly and surely to such stimuli than old people, but the former are generally inclined to be less cautious than the latter. Also, a substantial number of people are inclined to day-dream excessively when driving and as a result are accident-prone. Other similar examples will readily come to mind to anyone who has operated an automobile for any length of time, particularly in city traffic.

A common traffic problem is that where a line of vehicles moves along a highway, particularly on interurban highways, at relatively high speed. It is desirable under such conditions that a minimum safe distance be maintained between successive vehicles to prevent collision in the event that any one of the vehicles is forced by some emergency condition to suddenly slow down or stop. The correct distance to be maintained is dependent on the absolute speed of the vehicle, the braking distance of the vehicle, the rate of closure between vehicles, reaction time of the driver (among other factors). However, statistics show that much too frequently the vehicle operator fails to take into consideration all of these factors, or else fails to properly evaluate them, and collisions under the above circumstances are very frequent. Due to the high speed at which the vehicles are usually traveling on highways, it has been quite common for a rather large number of cars in a line of vehicles to successively collide with the immediately preceding car when one vehicle in the line is suddenly stopped, even though all vehicles may have been traveling at a legal rate of speed. Moreover, due to the high rate of speed of the vehicles under these conditions, serious property damage usually results, and very frequently operators and passengers of the vehicles suffer very serious personal injuries.

A similar and related problem occurs in city traffic. Due to the congestion of city streets in view of the sharp increase in use of automotive vehicles in recent years, it is a common everyday occurrence for a vehicle proceeding within the legal speed limit to be forced to stop quickly, e. g., to avoid hitting a pedestrian. The operator of the vehicle behind frequently is unable to stop it in sufficient time, due to an erroneous evaluation of his required reaction time and safe stopping distance, and a collision results.

Usually collisions in the foregoing discussed circumstances are attributable primarily to one or both of the following: (1) The vehicle operator, although having good reactions, may fail to maintain a minimum safe distance behind the car ahead so that he can stop his vehicle or slow its speed sufficiently to avoid a collision. Or, (2) although maintaining a minimum safe distance based on inherent physical factors (e. g. speed) and average operator driving ability, the second driver may react too slowly for the emergency due to day-dreaming, fatigue, below average mental and/or physical reactions, or other like factors.

Another similar problem is presently assuming considerable proportions on the new "super-highway" roads (such as the "New Jersey Turnpike") now coming into increasing use to meet the needs of an ever-growing automotive transport system. It has been found that on such super-highways many drivers are subject to what is sometimes broadly termed "road hypnosis." This causes them to become inattentive to speeds, obstacles, rate of closures, and other like factors, so that some drivers have actually driven into stationary obstacles, such as a trailer truck legally and properly parked on a parking strip off the highway, with disastrous results. Also many accidents have occurred because many drivers on the new super-highways are unable to effectively evaluate the minimum safe stopping distance for the unaccustomed high speeds permitted on such highways, which are considerably in excess of the legal speed limits on present conventional highways.

There are further related problems presenting a need for standardization of the vehicle braking and speed control mechanisms, as for example, control of speed on sharp curves, emergency stopping of a vehicle due to unexpected stationary obstacles on the road, such as fallen trees and road blocks, and other like problems.

Most of the problems discussed above have been recognized and appreciated for some time, and there have been a number of earlier attempts to solve them by providing automatic or semi-automatic vehicle control means for controlling speed and braking of the vehicle under emergency conditions independently of the vehicle operator's reactions.

Most of the vehicle control devices heretofore known are not self-contained on the vehicle per se but require external signalling, reflector or similar means in order for the device to operate. This is particularly the case with prior systems using a light beam or ray as a signal and acting on photoelectric cells interconnected with and operating the control mechanisms of the vehicle such as the brake and accelerator. It is not feasible to use light rays reflected by an obstacle back towards the same vehicle emitting them. There are presently no photoelectric cells which are capable of such adjustment that on the one hand they are sufficiently sensitive to detect rays reflected from the obstacle, particularly if it has a dark or dull surface, and yet which are simultaneously sufficiently discriminatingly insensitive to exclude the influence of stray light rays which are not intended to operate the vehicle controls. The disadvantages of such devices requiring external cooperating signal or reflecting means whether using light, radio or sonic waves is obvious. They do not enable any vehicle owner to install a control system in his own vehicle without the necessity of cooperation of others. Rather, such systems either require extensive road installation by municipal, state or other governmental units; or else they require installation of cooperating compatible units on all or most other vehicles on the road if they are to be effective. Since this is very difficult to achieve, and perhaps a practical impossibility, such systems have not been suitable for practical usage and have not been commercially feasible.

There has also been some effort heretofore to produce an automatic vehicle control device which is self contained and operates independently of and without assistance from external means. However, such prior devices have not been designed to correlate and control important inherent factors governing necessity and desirability for braking and slowing a vehicle, including such factors as absolute speed, distance and rate of closure between vehicle and obstacle; nor for other pertinent factors, as compensating for various typical low speeds and city traffic conditions (e. g. turning corners), unusual emergency situations, and like problems.

The main purpose and object of the present invention is to provide an automatic vehicle control device which operates vehicle controls such as the brakes and engine throttle of an automobile independently of mental and physical reactions of the vehicle operator and constitutes a practical, feasible solution to the above-discussed problems.

It is an object of the present invention to provide a device for a vehicle which automatically compensates for controllable physical variables inherent in operation thereof to automatically slow or stop it when operating conditions require, independently of the vehicle operator's reactions and manual control of the vehicle.

It is also a primary object of the present invention to provide a self-contained automatic vehicle control system for a propelled vehicle utilizing signals reflected from an obstacle which have been transmitted from the propelled vehicle itself, without the necessity of, and independently of, any external control or signalling means not on the vehicle itself.

It is a further object of the present invention to provide an automatic control means for a vehicle automatically compensating for, and responsive to, various basic physical factors determining safe stopping distance under actual driving conditions, whereby said control maintains minimum safe distance between the vehicle and another moving object ahead of it, or stops the vehicle to avoid collision.

It is another object of the present invention to provide an automatic vehicle control system which, through novel utilization of certain physical phenomena, compensates for, and is responsive to, variations in distance of the vehicle from an obstacle ahead of it by inherent characteristics of the system.

It is a further related object of the present invention to provide an automatic vehicle control system which through a novel utilization of other physical principles compensates for variation in the absolute speed of said vehicle.

It is another object of the present invention to provide an automatic vehicle control system having a relatively simple and relatively inexpensive speed-distance control device interconnected with the speedometer and a portion of said system whereby the said vehicle control means compensates for, and is responsive to, the speed-distance factor which governs the necessary reaction time for safely braking or slowing a vehicle.

It is a further object of the present invention to provide an automatic vehicle control system which, due to the novel utilization of certain physical principles, inherently compensates for variations in the rate of closure, i. e., relative velocity, between said vehicle and a moving obstacle ahead, e. g., another vehicle moving in the same direction.

It is another object of the present invention to provide an automatic vehicle control system having a single unit capable of acting as a combined transmitter-receiver to furnish the basic intelligence for said automatic control system as a whole, through a novel application of certain physical phenomena.

It is a further object of the present invention to provide a self-contained automatic vehicle control in which a single unit is capable of acting as a combined signal transmitter and receiver, whereby said combined unit is relatively inexpensive, and may be built in a small compact unit which can be readily mounted in position on the vehicle where it will be most effective.

It is a further object of the present invention to provide an automatic vehicle control comprising means to automatically compensate for usual operating conditions such as turning corners, or when the vehicle is close behind another at a stop light, and the like, without requiring special attention by the vehicle operator.

It is a further object of the present invention to provide an automatic vehicle control system having an emergency cut-out means which enables the operator to quickly and readily take over complete manual operation of the vehicle control mechanisms, such as brake and accelerator, in the event of an unforeseen unusual emergency.

It is another object of the present invention to provide a vehicle control system comprising means in conjunction with the emergency cut-out mechanism which keeps the automatic vehicle control system inactive after emergency cut-out until the operator takes affirmative action to again place said automatic vehicle control system into effective operation.

It is a further object of the present invention to provide a control system including the above-mentioned relatively simple, inexpensive but highly effective electronic signal transmission-receiver system cooperating with a relatively simple but highly effective mechanical system for operating simultaneously, or in controlled time relationship, the vehicle's brake actuating means and accelerator control means to throttle down and brake said vehicle when the vehicle control system is applied to automobiles, trucks, buses or like land vehicles.

Other objects and advantages and features of the present invention will become apparent from the following specification when considered in connection with the accompanying drawings and claims forming a part thereof.

In the drawings, which illustrate some simple and practical embodiments of the present invention:

Figure 1 illustrates the present invention in a general way as applied to land vehicles such as automobiles;

Figure 2 is a diagrammatic and schematic illustration of the principal components of the automatic vehicle control system of the present invention;

Figure 3 is a schematic wiring diagram of an illustrative embodiment of the speed-distance control and related electronic components of the present invention;

Figure 4 is a more detailed view of the speed-distance control of the present invention which is interconnected with the vehicle speedometer;

Figure 5 is an elevational, partly schematic view of the conventional brake and accelerator operating controls on an automotive vehicle and showing the automatic control system actuating means therefor;

Figure 6 is a diagrammatic illustrative plan view of the front end of an automobile on which the components of the automatic control system of the present invention are mounted;

Figure 7 is an illustrative modified lost-motion accelerator control linkage for use with an emergency cut-out in the automatic vehicle control system of the present invention; and Figure 8 is a schematic diagrammatic illustration of a modified embodiment of the electro-mechanical mechanism for operating the vehicle brake and accelerator controls when the present invention is applied to an automotive vehicle.

Referring to Figure 1, Figure 1(a) represents a condition in which the automatic vehicle control system on car A will operate to brake and throttle down car A and thus slow or stop it. Figure 1(b) illustrates a condition in which the automatic vehicle control system, though operating, does not act to slow or stop vehicle A because vehicle A is beyond minimum safe distance D from car B at the existing rate of closure between them.

Referring in particular to Figures 1, 2 and 3 of the drawings, car A has mounted on it a control device comprising an electronic signal and control system generally indicated at 10 in Figure 2 and an electro-mechanical brake and accelerator operating system generally indicated at 26 in that figure. The electronic signal and control system 10 comprises an ultra shortwave transmitter and receiver unit, generally indicated at 11, including oscillator-detector 12, antenna 14 and R. F. choke 16, an amplifier and discriminator 18, a speed distance control 20 interconnected with the car speedometer 22 and a thyratron 24 which is connected to the output of amplifier 18 and actuates the brake and accelerator operating means 26. Brake and accelerator operating means 26 comprises, inter alia, an actuating solenoid 34, limit switch 60, reversible motor 70, and related circuits, switches and mechanical linkages.

Referring in particular to Figures 1 and 2, the oscillator 12 produces a high frequency wave which is beamed ahead of car A by means of antenna 14 and reflectors of known type (not shown) which preferably produce a pencil-like beam. If the transmitted waves, which are indicated at 28 in Figure 1(a), meet an obstacle such as car B, a second series of waves is reflected back toward antenna 14 and the oscillator-detector 12, as schematically indicated at 30 in Figure 1(a). If there is no relative motion between cars A and B, the reflected signal 30 has a frequency which equals the frequency of the transmitted signal 28 and there is no effective signal through R. F. choke 16 and line 32 to the amplifier 18 and thyratron 24, so that the brake actuating mechanisms 26 are not energized to operate the brakes and engine throttle.

If there is relative motion between cars A and B, which is almost always the case in actual use, the natural phenomenon known as the Doppler effect causes the short wave frequency of the reflected signal 30 at antenna 14 to vary slightly from the frequency of the transmitted signal 28. Due to the Doppler effect, if car A gains on car B the reflected signal 30 has (or appears to have) a higher frequency than transmitted signal 28. If car A drops back away from car B, the frequency of the short wave reflected signal 28 is less (or appears to be less) than the frequency of the transmitted signal 30. The transmitted frequencies are such that the difference of frequency of reflected and transmitted signals will be of value in the audio-frequency range which is a very small frequency value compared to the very high frequency of the transmitted and reflected waves 28 and 30, respectively.

Assuming relative motion between cars A and B, the reflected signal 30 and the transmitted signal 28, which differ in frequency by an audio-frequency value $x$, are heterodyned in the oscillator-detector 12 to produce a wave of audio-frequency $x$. Being of relatively low frequency, this audio-frequency wave $x$ passes through the R. F. choke 16 producing a pulsating current in line 32 which is the input signal to amplifier 18, whereas the high frequency transmitted and reflected waves 28 and 30 are blocked from line 32 by the R. F. choke 16 due to its high impedance to high frequency waves.

Radio waves will travel a long distance even on a low energy transmission signal so that a pulsating current of audio-frequency $x$ may be produced in line 32 in the above-described manner when cars A and B are separated by a distance considerably in excess of the safe stopping distance for car A. However, the amplitude of the reflected signal 30 varies in inverse proportion to the distance between car A and car B so that as the distance between them decreases the amplitude of the reflected signal 30 increases, and vice versa. This is due to the fact that as this distance increases the reflected signal becomes more attenuated due to energy losses. The pulsating signal produced in line 32 has an amplitude which is proportional to, i. e., it is a function of, the amplitude of the reflected signal 30 so that the amplitude of signal input to amplifier 18 varies inversely with this distance.

These phenomena are utilized and controlled by means of the amplifier 18 and the related speed-distance control 20, described below, to control operation of the brake and accelerator actuating mechanisms 26, through solenoid actuator 34.

Amplifier 18 preferably has two or more stages in cascade. Referring in particular to Figures 2 and 3, current produced in line 32, which is of a very small voltage amplitude, is fed into the grid of the first triode of the amplifier 18, illustratively shown as comprising two triodes 36 and 38 in cascade. The amplifier 18 increases the amplitude of the input signal from line 32 enough to produce a positive E. M. F. sufficient to "buck out" the negative bias on the cathode of thyratron 24 and cause current to pass through it to line 40 and actuating solenoid 34. Solenoid 34 then activates the braking and decelerating mechanism 26 as discussed below.

Referring in particular to Figure 1, Figure 1(a) represents a condition in which the car A having the automatic vehicle control system of the present invention mounted thereon is at less than minimum safe distance D from the obstacle car B, and the signal 30 reflected by car B is of sufficient magnitude that after amplification in amplifier 18 it causes firing of the thyratron 24 thereby activating the brake and accelerator control mechanism 26. Figure 1(b) represents a condition in which the car A is at a safe distance D' from the obstacle, car B, and the signal 30' reflected by car B is of such small magnitude due to attenuation of emitted signal 28 that after amplification in amplifier 18 it is insufficient to cause firing of thyratron 24. Consequently, the brake and accelerator operating mechanism 26 will not be actuated.

Referring to Figures 4, 3 and 2, an illustrative embodiment of speed-distance control 20 comprises a modified speedometer indicator shown schematically at 22 having a plastic speed indicator needle 42. A pointer of steel or other conducting material shown in dotted lines at 44 is attached to needle 42 or its rotatable shaft 46 to rotate with needle 42. Needle 44 contacts an arcuate electrical resistance 48 to form a variable rheostat when the speedometer needle operates in the usual manner during operation of car A. Shaft 46 for steel needle 44 and one end of resistance 48 are connected to ground as indicated at 51 and 52, respectively, in Figures 3 and 4. The other end of resistance 48 adjacent the high speed portion of the speedometer dial is connected to the amplifier 18 by lead 50. In the illustrative circuit of Figure 3, lead 50 is connected to the cathode of the last stage triode 38 of amplifier unit 18 to control the gain thereof, but other wiring circuits can be used.

As the distance between cars A and B decreases, the amplitude of the reflected signal 30 and hence the input passing from line 32 to amplifier 18 will increase. If there were no speed-distance control 20 for amplifier 18 then when car A is close to car B, as in city traffic, thyratron 24 would tend to "fire" and actuate solenoid 34 and mechanism 26 to brake and decelerate car A. The brakes would be similarly applied when car B pulls away from car A at a traffic light since, due to their proximity, the Doppler effect will produce a relatively high amplitude input to amplifier 18. However, because car A is standing still, needle 44 is at the ground end 52 of the rheostat resistor 48 so that the full length of resistor 48 is in the cathode circuit of triode 38. This causes the voltage on the cathode of triode 38 in the amplifier 18 to be at a maximum so that amplification of the relatively strong input signal is held to a minimum. As a result, the value of the voltage at the plate of triode 38 is insufficient to produce a voltage on thyratron grid 54 large enough to "fire" thyratron 24. Solenoid 34 and mechanism 26 are hence not actuated and the brakes and accelerator of the car are not affected by the control system.

In a similar manner, the speed-distance control governs the electronic components to take care of a major inherent problem in an automatic vehicle control system of this type. If such a system is to be practical, it is essential that the solenoid actuator 34 and the related actuating mechanism 26 be variably responsive to the time and distance factors which determine when a car must be braked to be stopped safely. For example, according to National Safety Council data, under average conditions, with an average driver, the safe braking distance for varying speeds will vary as follows:

| Speed in Miles Per Hour | Driver Reaction Distance, Feet | Stopping Distance, Feet | Total Braking Distance in Feet |
| --- | --- | --- | --- |
| 20 | 22 | 21 | 43 |
| 30 | 33 | 47 | 80 |
| 40 | 44 | 84 | 128 |
| 50 | 55 | 131 | 186 |

The speed-distance control 20 governs the electronic components indicated generally at 10, 12, 18 and 24 to make solenoid 34 and the related brake operating circuits and mechanisms 26 responsive to these time and distance factors. As the speed of the car increases, the needle 44 rotates with the speedometer indicator 42 shorting out part of resistor 48 so that the voltage at the cathode of triode 38 is decreased and approaches a minimum value when needle 44 is in the 100 mile per hour position on resistor 48 adjacent lead 50. This increases the amplification of the input signals to amplifier 18 proportionately to the increase in speed of the vehicle and will increase the voltage in the plate of triode 38 so that thyratron 24 reaches the "firing point" sooner when the vehicle's velocity increases.

Interposed between the amplifier 18 and the thyratron 24 is a condenser 55 which is of relatively high impedance at low frequencies and relatively low impedance at high frequencies. If car A is approaching car B at a high rate of relative velocity, the signal passing through condenser 55 is of a relatively high frequency and the condenser 55 passes the signal from amplifier 18 to the thyratron 24 with only a small loss of potential. If, on the other hand, car A is approaching car B at a low rate of relative velocity, the signal passing through condenser 55 is of a relatively low frequency and the condenser 55, although passing the signal from amplifier 18 to the thyratron 24, does so with a greater loss of potential thereby reducing the potential on thyratron grid 54. This compensates for variations in rate of closure between cars A and B as it makes the electronic control device more sensitive at high rates of closure and less sensitive at lower rates of closure. This is independent of, and supplements the action of, variable speed-distance control 20 connected to speedometer 22, which has previously been described.

While the speed-distance control 20 and condenser 55 compensate for the change in minimum safe braking distance due to car speed, the distance factor is automatically partially compensated for by the above-discussed inherent characteristic of the system which causes the amplitude of the input signal to increase as the distance between the car and the obstacle before it decreases, thereby tending to cause thyratron 24 to "fire" sooner to actuate solenoid 34 and mechanism 26.

Thus, it is possible to adjust the electronic system in conjunction with the speed-distance control 20 to compensate simultaneously for both factors of speed and distance, and also rate of closure, thereby achieving a self-contained automatic automobile vehicle brake actuating system responsive to the three main factors which determine safe stopping distance in actual driving, namely, absolute speed, rate of closure and distance from obstacle.

In a similar manner, the speed-distance control provides a means for adjusting amplification so that the thyratron 24 is not "fired" when the car turns a corner and the transmitted signal is reflected from an adjacent building with relatively high amplitude. The speed-distance control 20 and resistor 48 can be adjusted so that if car A is moving below a predetermined safe speed, the amplifier output to the thyratron 24 is insufficient to "fire" it and cause the solenoid actuator 34 to operate.

Referring in particular to Figure 2, the above-described electronic system controls automatic actuation of the vehicle brake cylinder 56 and accelerator link 58 through actuating mechanism 26 in the following manner:

When the thyratron 24 is not passing a current, solenoid actuator 34 does not actuate limit switch 60 comprising normally closed contact 62 and normally open contact 63, whereby contact 62 remains closed. This permits current to pass from the power pack 64 through line 66, limit switch 68, normally closed contact 62, motor 70 and neutral conducting line 72, thereby causing motor 70 and threaded shaft extension 74 to rotate clockwise. This causes threaded nut 76 to move upward in Figure 1 so that the brakes and accelerator linkages, shown in Figures 5 and 6 and hereinafter described, are unaffected by the vehicle automatic control system. Nut 76 will eventually operate limit switch 68 to break line 66 in the above circuit, thereby stopping motor 70, and this condition, hereinafter referred to as "normal," will hold so long as thyratron 24 is not "fired" by the speed-distance control regulated electronic system 10.

When driving conditions require that the car be stopped, a signal passes through line 32 causing thyratron 24 to be fired in the above-described manner thereby actuating solenoid 34 which acts on limit switch 60 to open normally closed contact 62 and close normally open contact 63. This causes current to pass from the power pack 64 through line 78, limit switch 80, normally closed contact 82 of the emergency cut out switch indicated generally at 84, contact 63, motor 70 and neutral conditioning line 72, thereby causing motor 70 and shaft extension 74 to rotate counterclockwise. This counterclockwise rotation causes nut 76 to move downward in Figure 2 and to the right in Figures 5 and 6 to apply the brakes and stop acceleration of the car by means of the above-mentioned linkage.

Such movement of nut 76 causes a corresponding movement of arm 86 attached thereto, or integral therewith, in turn moving sleeve 88 which is connected to arm 86 by a pin and clevis or other suitable connection 90. Sleeve 88 has a longitudinally extending recess 92 of square or other suitable non-circular cross-section which telescopically and slidingly receives square rod 94 so that movement of sleeve 88 rightward in Figures 5 and 6 transmits motion through rod 94 and connection 96 to member 98 to move the latter in the same direction. Member 98 is connected to link 99 and piston rod 100 of master brake cylinder 56 so that rightward movement of nut 76, sleeve 88, rod 94 and member 98 moves piston 100 to develop hydraulic braking pressure in fluid lines 101, 102 and 104 thereby actuating the hydraulic brakes of car A in conventional manner. At the same time rightward movement of member 98 draws slotted link member 99 down towards the right in Figure 5 so that the end 108 of slot 109 moves pin 110 and arm 112 of bell crank lever 114 counterclockwise when the accelerator pedal 115 and rod 116 are depressed to sufficient extent that the end 108 of slot 109 may act on pin 110. When pin 110 and arm 112 are thus moved in counterclockwise direction, the accelerator link control member 58 acts on the carburetor intake throttle valve, and throttles the car engine down to idling speed.

The sequence of the throttling and braking operations depends on the adjustment of the linkages described, and if desired the linkages may be arranged so that the engine is first throttled before the brakes are actively applied, or vice versa, by adjusting the lengths and positions of the various links.

The above-described structure permits the driver to at any time apply the brakes manually without interfering with the automatic control mechanism described, as upon application of pressure to the brake pedal 117, the pin 118 on arm 120 of bell crank 121 moves member 98 and master cylinder piston 100 to the right in Figure 5 thereby developing the necessary hydraulic braking pressure in master cylinder 56 and lines 101, 102 and 104. During this manual operation of the brake pedal 117, the square rod 94 is merely displaced rightward within the sleeve 88 while the latter remains in fixed position.

Therefore, while the automatic control mechanism 26 and operating motor 70 can actuate throttle linkage 58 and master cylinder piston 100 to throttle down the engine and apply the brakes, the driver is perfectly free to operate the accelerator and brake pedals. If the driver decelerates the car or applies the brakes in time, the automatic mechanism will not come into effect due to the action of the speed-distance control 20 and condenser 55, as described above; or, if it does come into effect, it will merely follow-up the brake and accelerator control movements which have already been initiated by the driver. However, if the driver fails to decelerate the car or to apply the brakes in sufficient time when an obstacle is in front of him below the minimum safe braking distance for rate of closure between vehicle and obstacle, the automatic vehicle control of this invention will immediately become effective and cause the vehicle to be decelerated and stopped. Further, the decelerating action in the latter case creates an upward pressure on the accelerator pedal 115 which warns the operator of the vehicle A that deceleration is required.

When nut 76 strikes limit switch 80 it breaks line 78 in the above circuit to stop rotation of motor 70 in a counterclockwis direction. The brakes then remain applied so long as the electronic circuit determines that this is necessary. This is done by maintenance of a current passing through thyratron 24 thereby keeping solenoid 34 actuated and normally open contact 63 closed. When the speed-distance controlled electronic circuit 70 determines that braking and deceleration is no longer necessary i. e., when the signal input to thyratron 24 falls below the minimum potential required for the thyratron to pass current, solenoid 34 is deactivated thus permitting contact 62 to reclose. This completes circuit 66—68—62—66—72 causing motor 70 to rotate clockwise, thereby moving nut 76 upward towards limit switch 68, so that piston 100 moves leftward in Figure 5 to release the brakes and accelerator link 58 permitting depression of the accelerator pedal 115 by the vehicle operator. Nut 66 will eventually operate limit switch 68 to break line 66 and stop motor 70, leaving actuating mechanism 26 "normal" condition.

An emergency cut out switch may be provided, with related circuits, to enable the driver to voluntarily cut out the automatic braking action when necessary, e. g., in an unforeseen emergency. An illustrative embodiment of such a cut-out is schematically shown in Figure 2 comprising a push-button switch 84 having a normally closed contact 82 and normally open contact 83. To operate the cut-out switch, the driver just fully depresses the accelerator pedal 115, which in most such emergencies will be a natural reaction. Emergency cut-out switch 84 is located and adjusted on car floor 119 so that accelerator pedal 115 will operate it at the lowest level of its movement, thereby opening normally closed contact 82 and simultaneously closing normally open contact 83. This breaks line 78 to immediately cut off counterclockwise braking rotation of motor 70. Simultaneously, motor 70 is rotated in clockwise direction to positively release the brakes and permit full use of the accelerator. This is caused by current flowing through line 78, line 126, contact 83, relay 128, and line 72, thereby activating relay 128 to normally open contact 130, thus making current flow to motor 70 through circuit 66—68—130—132—66—70—72 to rotate motor 70 clockwise. This moves nut 76 upward to release the brakes even though thyratron 24 permits passage of current of solenoid 34 keeping it actuated and holding contact 62 open and contact 63 closed.

When such an emergency cut-out is used with the vehicle control system, a suitable lost motion connection is preferably provided in the accelerator control linkage because motion of the latter when actuated by the automatic control is opposed to manual depression of the accelerator pedal. An illustrative embodiment thereof is shown in Figure 7 comprising a link 99a which is substituted for integral link 99 of Figure 5. Link 99a comprises two sections 99b and 99c connected for relative sliding motion by a pair of pins 123 secured to section 99c and extending through longitudinal slot 125 in section 99b. A spring 127 of suitable tension holds sections 99b and 99c together normally but permits relative displacement of section 99b as arm 112 and pin 110 are rotated clockwise when pedal 115 is depressed to actuate cut-out switch 84.

A holding circuit may be provided for relay 128 and contact 130 including in series therewith a normally closed push button switch (not shown) mounted on the dash board of car A. Once the emergency cut-out switch 84 is operated by depression of the accelerator pedal 115 in the above-described manner, the motor 70, and nut 76 will continue to remain in "normal" condition. Further, the electronic signal control system 10 and electro-mechanical operating means 26 will have no control over the brakes and accelerator but the latter will be completely governed by manual operation. After the emergency is over, the operator can then push the push button switch on the dash board to open the normally closed contact thereof thereby deenergizing said holding circuit relay 128 so that the electronic signal control 10 and electro-mechanical brake and accelerator operating means 26 are free to automatically brake and decelerate vehicle A when necessary, in the above described manner. A similar holding circuit with dash board switch may be alternatively provided for cut-out switch 84 together with a holding solenoid to hold contact 82 open and 83 closed.

If emergency cut-out switch 84 is omitted, line 78 is connected directly between limit switch 80 and contact 63, and components 126, 128, 130 and 132 shown in Figure 2 are also omitted.

Figure 8 discloses a modification of the brake and accelerator operating mechanism generally indicated at 26a which may be used, if desired, in lieu of the above-described operating mechanism 26 shown in Figures 2, 5 and 6. For clarity, like parts are identified with the same numerals used for the embodiment of Figures 2, 5 and 6, and similar corresponding parts are identified, insofar as feasible, with the same numeral plus the subscript a.

Referring in particular to Figure 8, hydraulic motor 70a is mounted on the frame of the vehicle in the same approximate position as motor 70 in Figure 6 but preferably displaced to a position in line with rod 94 as schematically shown in Figure 8. Piston 140 has an extension 74a to which collar 88a is secured in any suitable fashion with the square recess 92 thereof slidably receiving square rod 94. Movement of piston 140 operates piston 100 of brake cylinder 56 and accelerator links 99 et seq. in the same manner as by movement of nut 76 in the above-described embodiment of Figures 2, 5 and 6. Such movement of piston 140 is responsive to actuation of solenoid 34 by an electronic control system identical with system 10 described in connection with the embodiment in Figures 2, 5 and 6 and cylinder 70a and piston 140 are actuated by the illustrative electro-hydraulic system schematically shown at 26a in Figure 8.

An oil pump schematically shown at 142 and provided with a conventional pressure control valve 143 is suitably mounted on the car A so it may be driven by the car fan belt through pulley 144 to pump oil at appropriate pressure into line 146 to the inlet of a conventional double-acting, solenoid-controlled selector valve schematically shown and generally indicated at 148. Selector valve 148 comprises a cylinder 150 with a double piston 151 having lands 152 and 154 on rod 156. Piston 151 is normally retained (by conventional means not shown) in neutral position when both solenoids 162 and 164 are not energized so that its lands are in the dotted line positions 152′ and 154′ blocking off lines 158 and 160 which are connected to cylinder 70a on opposite sides of piston 140. If solenoid 164 is energized, piston 151 is displaced as shown in full lines in Figure 8 to permit flow of oil under pressure from line 146 to line 160 and the underside of piston 140 while at the same time oil from the upper half of cylinder 70a is exhausted to pump sump 166 through line 158, valve 148, and return line 168. Conversely, if solenoid 162 is energized, piston 151 is correspondingly displaced upward in Figure 8 from neutral position to permit flow of oil under pressure through line 146, valve 148 and line 158 to the upper side of piston 140 to move it downward, and oil is returned to sump 166 through line 160, valve 148, and return line 170.

When solenoid 34 is not actuated by the electronic signal control system 10, normally closed contact 62a of limit switch 60a remains closed and current flows from the power source (which is either the car battery or a power pack such as 64 in Figure 2) through circuit 66a—164—68a—66a—62a—ground, thereby energizing solenoid 164 to displace piston 156 downward and produce upward movement of piston 140. Piston 140 continues upward until lug 172 on collar 88a operates to break limit switch 68 thereby breaking the above circuit and deenergizing solenoid 164. This causes piston 151 to return to neutral position blocking lines 158 and 160 so that piston 140 is held in the up position by oil on both sides thereof, and the operating mechanism 26a is now in "normal" condition.

When electronic system 10 causes solenoid 34 to be actuated in the manner previously described in connection with Figures 2, 5 and 6, this operates limit switch 60a to open normally closed contact 62a and close normally open contact 63a completing circuit 78a—80a—162—63a—ground, thereby energizing solenoid 162. Energizing solenoid 162 displaces piston 156 upward causing piston 140 to move downward moving member 94 to actuate piston 100 of master brake cylinder 56 and link 99 et seq. of the accelerator control linkages to apply the brakes of the vehicle and throttle down the engine to idling speed. The limit of movement in this direction is governed by limit switch 80a operated by lug 172 at a predetermined maximum displacement to break the circuit of solenoid 162 and deenergize it. This causes piston 151 to return to neutral position blocking lines 158 and 160 so that piston 140 remains in the down position thereby continuing to apply the brakes and throttle down the engine until the electronic signal control system 10 determines that automatic operation of brakes and throttle is no longer necessary due to change in driving conditions (e. g., speed of vehicle A, and rate of closure and distance between vehicle A and the obstacle before it). At that time, solenoid 34 is deenergized so that normally closed contact 62a of limit switch 60a is again closed energizing solenoid 164 and causing piston 140 to return to the up "normal" position.

It will be seen from the foregoing that the present invention provides an automatic vehicle control device which, among things, automatically operates a self-propelled vehicle to slow or stop it when driving conditions require, independently of the vehicle operator's reactions and manual control thereof; and which compensates for, and is responsive to, controllable physical variables which determine whether a vehicle should be slowed or stopped when it approaches an obstacle, by the novel utilization of various physical phenomena; and which is self-contained and hence usable on a vehicle without the necessity of cooperation of others; and is compact and economical to produce and easy to apply particularly to automotive vehicles such as automobiles, trucks and buses, so that it is commercially feasible; and is adapted to compensate for a variety of usual and unusual conditions encountered in operation of such vehicles and particularly automotive vehicles, which must be compensated for if the automatic vehicle control system is to be commercially feasible; and has novel actuating and operating means which are highly effective for operating the vehicle controls; and also has a number of other novel important features fully discussed and described above.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A self contained automatic control system for a vehicle to avoid collision thereof with an obstacle, said vehicle having conventional mechanisms for controlling acceleration, deceleration, and stopping thereof, and a speed responsive mechanism, comprising: a combined transmitter-receiver means for producing and emitting a high frequency radio signal and for receiving the reflection of such signal from an obstacle; amplification means; means producing a signal having a relatively low frequency equal to the difference in frequency between the signal emitted by said transmitter and the signal received by said receiver, said low frequency signal being fed to said amplification means; means controlled by the signal from said amplification means for operating said vehicle controls as a function of the distance of said vehicle from an obstacle reflecting signals from said transmitter to said receiver and as a function of the relative speed with which said vehicle approaches said obstacle; control means associated with said vehicle speed responsive mechanism and said amplification means for making actuation of said vehicle controls responsive to the speed of said vehicle, whereby said automatic control system governs deceleration and stopping of said vehicle responsive to its absolute speed and its distance and rate of closure with respect to said obstacle.

2. A self-contained automatic vehicle control system as defined in claim 1, wherein said control means associated with said vehicle speed responsive mechanism comprises means for varying the gain of said amplification means.

3. A self-contained automatic control system for a vehicle to avoid collision thereof with an obstacle, said vehicle having conventional mechanisms for controlling acceleration, deceleration, and stopping thereof and a speed responsive mechanism, comprising: transmission-receiver means for producing and emitting a radio frequency signal and receiving the reflection of said signal from an obstacle, means for producing a beat signal when said reflected signal has frequency different from that of said emitted signal, amplification means receiving and amplifying said beat signal, a gaseous discharge tube controlled by the amplified beat signal from said amplifier, and actuating means operatively associated with said gaseous discharge tube for operating said vehicle control mechanism, control means associated with said vehicle speed responsive mechanism making said actuating means responsive to the speed of said vehicle.

4. A self-contained automatic vehicle control system for a vehicle to avoid collision thereof with an obstacle, said vehicle having brake and throttle controls, comprising: a transmitter-receiver means for emitting a radio signal and receiving the reflection of said signal from an obstacle, said transmitter-receiver means including means for producing a signal having a frequency equal to the difference in frequency between said transmitted and received signals, operating means comprising a reversing motor operatively connected with the brake and throttle controls to cause braking and deceleration of the vehicle in one direction of motor operation and non-braking action in the other direction, actuating means operatively associated with said transmitter-receiver means for actuating said reversing motor responsive to said difference in frequency signal from said transmitter-receiver means, and means responsive to the speed of said vehicle associated with said actuating means and making the motion of said motor also responsive to vehicle speed.

5. A self-contained automatic vehicle control as defined in claim 4 wherein said motor comprises a reversing electric motor suitably mounted on said vehicle.

6. An automatic self-contained vehicle control as defined in claim 4 wherein said operating means comprises a reciprocating piston hydraulic motor.

7. A self-contained automatic vehicle control system as defined in claim 4 wherein said motor is a reciprocating piston hydraulic motor, and said operating means further comprises a solenoid operated hydraulic valve control responsive to said last named actuating means.

8. In a vehicle having a brake, a control system for avoiding collision with an obstacle, comprising radio frequency transmitting and receiving means mounted on said vehicle and positioned to transmit a signal in the direction of movement of the vehicle and to receive reflections of said transmitted signal, said transmitting and receiving means including means for producing a beat signal having a frequency equal to the difference between the frequencies of said transmitted and said reflected signals, actuating means for said brake, and amplifying means driven by said beat signal and connected to said actuating means for actuating said brake, said amplifying means producing a signal which is responsive to the absolute speed of said vehicle, whereby said vehicle is braked as a function of its absolute speed, its distance from said obstacle and the relative speed with which it approaches said obstacle.

9. In a vehicle having a brake, a control system for avoiding collision with an obstacle comprising radio frequency transmitting and receiving means mounted on said vehicle and arranged to transmit a signal in the direction of movement of the vehicle and to receive reflections of said transmitted signal, said transmitting and receiving means including means for producing a relatively low frequency signal having a frequency equal to the difference between the frequencies of said transmitted and reflected signals, actuating means for said brake, means including amplification means receiving said low frequency signal and controlling said actuating means as a function of the absolute speed of said vehicle, its distance from said obstacle and its rate of approach to said obstacle.

10. In an automotive vehicle having a brake, a control system for avoiding collision with an obstacle comprising a high frequency radiant energy transmitter mounted on said vehicle and positioned to transmit a signal in the direction of movement of the vehicle, a receiver mounted on the vehicle and positioned to receive the signal emitted from the transmitter and reflected from an obstacle in the path of movement of the vehicle, means for amplifying any difference in frequency between the transmitted and received signals resulting from relative movement between the vehicle and obstacle, means rendering said amplified signal responsive to the speed of the vehicle, and actuating means controlled by the amplified signal for actuating the vehicle brake as a function of the absolute speed of said vehicle, the rate at which it approaches said obstacle, and its distance from said obstacle.

11. In an automotive vehicle having a control system as defined in claim 10, means for maintaining the transmitted signal at a substantially constant amplitude, and means for preventing operation of the actuating means when the received signal has less than a predetermined amplitude whereby the operation of the brake is dependent upon the distance between the vehicle and the obstacle.

12. In an automotive vehicle having a control system as defined in claim 10 wherein said means rendering said amplified signal responsive to the speed of the vehicle comprises speed responsive means movable proportionately to the speed of the vehicle and means actuated by said speed responsive means for controlling the amplitude of the amplified signal, whereby the operation of the brake is dependent upon the speed of the vehicle.

13. In an automotive vehicle having a control system as defined in claim 10, manually operable cutout means for rendering said system ineffective.

14. In an automotive vehicle having a brake, a control system for preventing collision with an obstacle, comprising a high frequency, constant amplitude radio transmitter mounted on said vehicle and positioned to transmit a signal in the direction of movement of the vehicle, a receiver mounted on the vehicle and positioned to receive the signal emitted from the transmitter and reflected from an obstacle in the path of movement of the vehicle, an amplifier receiving from said receiver a low frequency signal having a frequency equal to the difference between the frequencies of said transmitted and received signals, a choke between the receiver and the amplifier, an actuator connected to said amplifier responsive to signals of predetermined amplitude, means rendering said actuator responsive to vehicle speed, and means operated by said actuator for applying the vehicle brake as a function of the absolute speed of said vehicle, the rate at which it approaches said obstacle, and its distance from said obstacle.

15. In an automotive vehicle having a control system as defined in claim 14, said means rendering said actuator responsive to vehicle speed comprising speed responsive means movable proportionately to the speed of the vehicle, and means actuated by said speed responsive means for varying the amplitude of the amplified signal.

16. In an automotive vehicle having a control system as defined in claim 14, manually operable cutout means for rendering the control system ineffective.

17. An automatic control system for an automotive vehicle having controls for controlling its rate of motion, comprising a high frequency radiant energy transmitter mounted on said vehicle for emitting a high frequency unmodulated signal in the direction of movement of the vehicle, a receiver mounted on said vehicle for receiving signals reflected from said transmitter by an obstacle, switch means, means responsive to a difference in frequency between the transmitted and received signals for actuating the switch means, means responsive to the speed of said vehicle associated with said means responsive to said difference in frequency to make actuation of said switch also a function of the speed of said vehicle, and means actuated by the switch means for actuating the vehicle controls.

18. In an automotive vehicle having a brake, a control system for avoiding collision with an obstacle comprising high frequency transmitting and receiving means mounted on said vehicle and positioned to transmit a signal in the direction of movement of the vehicle and to receive reflections of said transmitted signal, means for heterodyning said transmitted and received signals to produce a beat signal, actuating means for said brake, and amplifying means driven by said beat signal and delivering to said actuating means a signal which is a function of the frequency and amplitude of said beat signal and the speed of said vehicle, whereby said vehicle is braked as a function of its absolute speed, its distance from said obstacle, and the relative speed with which it approaches said obstacle.

19. In a vehicle having a brake, a control system for avoiding collision with an obstacle comprising high frequency transmitting and receiving means mounted on said vehicle and positioned to transmit a signal in the direction of movement of the vehicle and to receive reflections of said transmitted signal, means for producing a beat signal having a frequency equal to the difference between the frequencies of said transmitted and said reflected signals, actuating means for said brake, and amplifying means driven by said beat signal and connected to said actuating means for actuating said brake said amplifying means producing a signal which is a function of the frequency and amplitude of said beat signal and of the speed of said vehicle, whereby said vehicle is braked as a function of its speed, its distance from said obstacle, and the relative speed with which it approaches said obstacle.

References Cited in the file of this patent

UNITED STATES PATENTS

| 1,495,616 | Simpson | May 27, 1924 |
| 2,216,575 | Seinfeld et al. | Oct. 1, 1940 |
| 2,233,392 | Allen | Mar. 4, 1941 |
| 2,444,171 | Sanders | June 29, 1948 |
| 2,493,755 | Ferrill | Jan. 10, 1950 |
| 2,513,279 | Bradley | July 4, 1950 |
| 2,620,470 | Rather, et al. | Dec. 2, 1952 |
| 2,629,865 | Barker | Feb. 24, 1953 |
| 2,634,413 | Potter | Apr. 7, 1953 |
| 2,690,555 | Bradley | Sept. 28, 1954 |
| 2,699,834 | O'Brien | Jan. 18, 1955 |
| 2,702,342 | Korman | Feb. 15, 1955 |

OTHER REFERENCES

The Radio Amateur's Handbook, 31st ed., 1954. Page 541.